United States Patent [19]
Franchi

[11] 3,745,829
[45] July 17, 1973

[54] LEVEL MEASURING EQUIPMENTS
[75] Inventor: Pierre Paul Franchi, Vitry-sur-Seine, France
[73] Assignee: L'Electronique Appliquee, Montrouge, France
[22] Filed: Oct. 18, 1971
[21] Appl. No.: 189,917

[52] U.S. Cl. .............................. 73/290 V, 310/9.1
[51] Int. Cl. ...................... G01f 23/28, H01v 7/00
[58] Field of Search .................... 73/290 V, 339 A; 310/9.1–9.4

[56] References Cited
UNITED STATES PATENTS

| | | | |
|---|---|---|---|
| 3,110,890 | 11/1963 | Westcott et al. | 73/290 V X |
| 3,578,995 | 5/1971 | Massa | 310/9.1 X |
| 3,693,445 | 9/1972 | Johnson | 73/290 V |
| 3,486,377 | 12/1969 | Franchi | 73/290 V |
| 3,603,149 | 9/1971 | McKown | 73/290 V |
| 3,100,885 | 8/1963 | Welkowitz et al. | 73/290 V X |
| 3,115,615 | 12/1963 | Saper | 73/290 V X |
| 3,394,589 | 7/1968 | Tomioka | 73/290 V |
| 3,266,311 | 8/1966 | Andreasen et al. | 73/290 V |
| 3,482,121 | 12/1969 | Hatschek | 310/8.9 X |

Primary Examiner—Richard C. Queisser
Assistant Examiner—Frederick Shoon
Attorney—Solon B. Kemon and William T. Estabrook

[57] ABSTRACT

An electroacoustic liquid level measuring device useful in a cryogenic environment to yield measurements having an accuracy of a few millimeters in liquid level measurements of 20 or 30 meters is disclosed. The device includes a pair of electroacoustic transducers located at different levels in a tank. The transducers both drive a digital read out indicator through a gating arrangement which is effective to cause the indicator to be activated only by one of the transducers at a time depending on the level of liquid in the tank. The gating arrangement is also effective to compensate for differences in the velocity of sound in the liquid due to temperature variations.

7 Claims, 2 Drawing Figures 3,745,829

LEVEL MEASURING EQUIPMENTS

SHORT SUMMARY OF THE INVENTION

The present invention concerns improvements in or relating to the measurement of the level of a liquid medium by means of acoustic, i.e. ultra-sonic waves in large capacity tanks.

It is an object of the invention to provide an ultrasonic wave level measuring equipment which ensures a high degree of accuracy during the final periods of filling and the beginning periods of emptying a tank.

A further object of the invention is to provide such an equipment which is specially adapted to level measurements in liquid mediums wherein the velocity of the acoustic waves varies for small variations of temperature of the liquid in the tank, especially when the liquid medium is an intrinsically low temperature medium such as a liquefied gas, f.i. liquid nitrogen or methane.

According to a feature of the present invention, there is provided acoustic wave level measuring apparatus for use with large capacity liquid medium tanks, including a first electro-acoustic transducer means in the lower part of the tank activated at a first pulse frequency and second electro-acoustic transducer means in the upper part of the tank activated at a second pulse frequency higher than the first, first and second circuits processing the pulses respectively collected from the first and second transducer means and deriving therefrom first and second series of signals respectively measuring the values of the distances of the level of the liquid medium above the first and second electro-acoustic transducer means, a digital display metering apparatus having inputs respectively connected to the outputs of the first and second processing circuits and means controlled from a condition of the second processing circuit for selectively enabling the one or the other of the inputs of the digital display metering apparatus.

DETAILED DESCRIPTION

Figure 1:
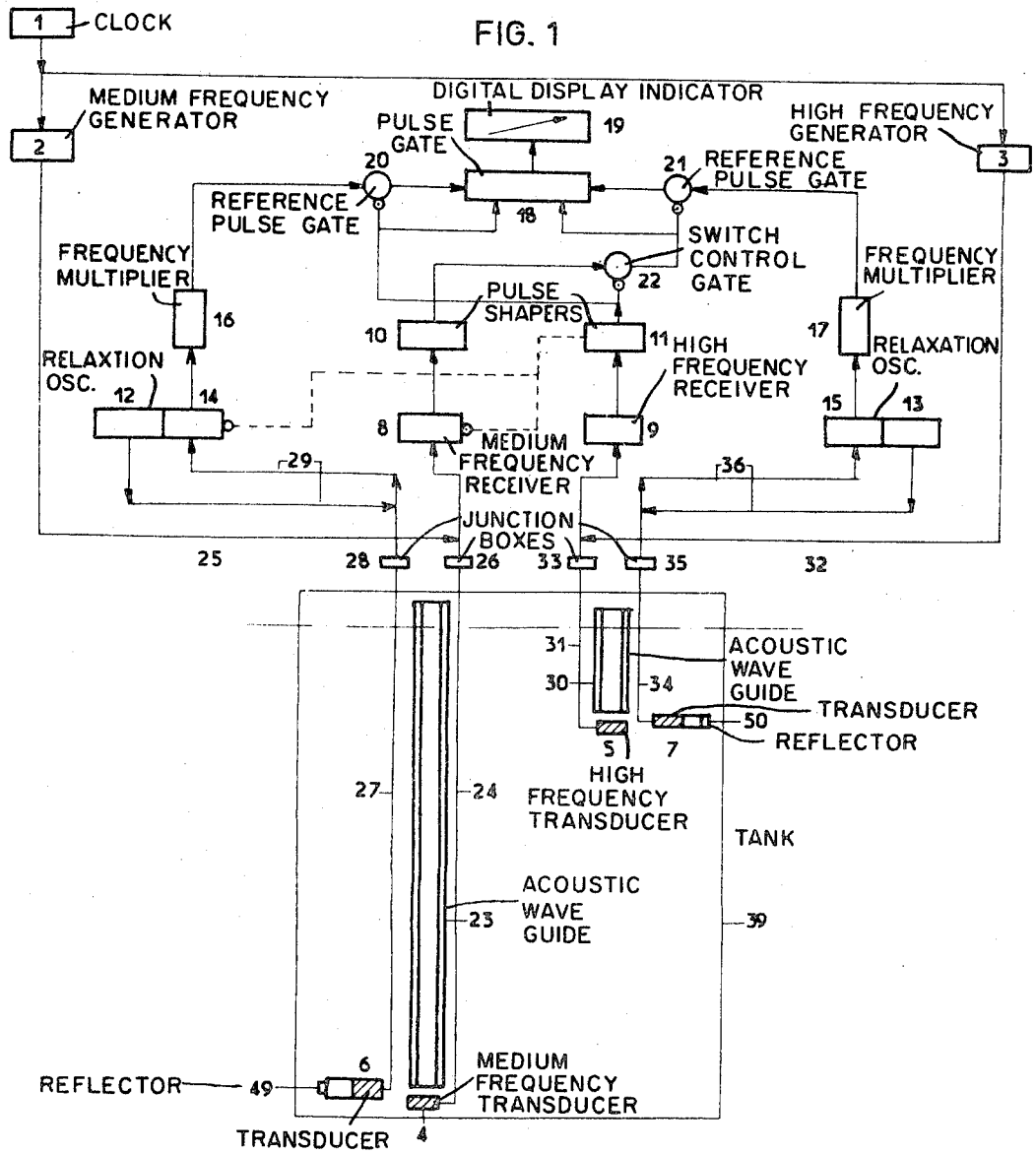
FIG.1 shows an illustrative example of embodiment of the invention.

In, FIG.1, a tank 39 of large capacity is arranged to receive a very low temperature liquid medium such as a liquefied gas. The filling of the tank must be carried out with a high degree of accuracy so that the maximum permissible level must be defined within a few millimetres whereas the depth of the tank is very great, for example about twenty metres.

Near the bottom of the tank is provided a first acoustic wave transducer 4, preferably under an acoustic wave guiding tube 23 which is open at both ends, and may be further slotted if required, in order that the liquid medium can freely enter it. A second transducer 5 is provided near the top of the tank at a defined distance from the maximum permissible level of the liquid medium in the tank, for instance one meter lower than the maximum permissible level. Preferably too, an acoustic wave guiding tube 30 is also placed over the second transducer 5. Each one of said transducers generates ultra-sonic waves and each one of them also is adapted to receive ultra-sonic waves. Alternatively an arrangement comprising two transducers, one for the generation of the ultrasonic waves and the other for the reception of the ultrasonic waves, may be provided.

Two electric wave generators 2 and 3 are synchronized from a clock pulse generator 1 and respectively feed the transducers 4 and 5. The generator 2 feeds the transducer 4, via the cables 25 and 24 with an electric signal having a frequency selected between 200 and 300 K Hz. The generator 3 similarly feeds the transducer 5, via the cables 32 and 31, with an electric signal having a frequency substantially equal to 1 M Hz. The acoustic waves returning to the transducer 4 are reconverted into electric signals which are applied to a receiver 8 and the acoustical waves returning to the transducer 5 are reconverted into electrical signals which are applied to a receiver 9. Each receiver circuit receives both the energizing pulses and the echo pulses, selects and amplifies the echo pulses. The signals issuing from 8 and 9 are applied to respective shaping circuits 10 and 11. Each one of said shaping circuits delivers a rectangular waveform signal the length of which is proportional to the time interval between an energizing pulse and the corresponding echo pulse. Said signal is applied to a gate 18 receiving counting pulses of a higher rate than the transducer energizing pulses. The output of 18 is connected to the actuation input of a counter 19 which is arranged in decades each one provided with a visible display of its content. Such an arrangement is known per se except that, in its application to the above described apparatus, there are two control paths for the gate 18 and, of course, only one of these two paths controlling said gate as it will be herein below described.

The broad principle of the measure is conventional: a piezoelectric transducer provided with a "speaking" face contacting the liquid medium transmits an acoustic vibration through the liquid, said vibration is reflected back by surface of the medium to said face for energizing the transducer as a receiver. The measure of the time interval $t$ of such a to and fro travel of the ultrasonic vibration gives the measure of the level from the relation:

i. $t = 2 h / c$ wherein $h$ is the distance between the speaking face of the transducer and the surface of the medium and $c$ is the velocity of propagation of the waves within the concerned liquid medium. The reception of the echo signal produces an electrical signal which closes a clock pulse supplied gate which has been opened at the time instant of the transmission of the acoustic vibration. The number of clock pulses passed through this gate and applied to a counter gives a measure of the distance between the speaking face of the transducer and the surface of the liquid medium.

During the filling of the tank, the transducer 4 is first energized so that the receiver circuit 8 and the shaping circuit 10 are activated and the measurement is carried out with a medium rate accuracy, the gate 18 and the pulse counter being controlled 19 from the output of said circuit 10. The receiver circuit 9 is not responsive as long as the level of the liquid is lower than the transducer 5, since, although the transducer 5 receives electrical energization pulses, the attenuation of the acoustic pulses transmitted towards the top wall of the tank through the air will be such that no echo is received. The accuracy is of the order of $10^{-2}$ in the displayed values in 19. When the liquid medium reaches the level of the transducer 5, any echo from the surface of the medium to said transducer 5 is higher than the threshold of the receiver circuit 9. The output of the receiver 9, and consequently of the shaping circuit 11 must take the control of the gate 18 in order that the measurement accuracy may be increased, the order of $10^{-3}$ of the displayed value. This is achieved by inhibiting the receiver circuit 8 from an output of the shaping circuit 11, as shown in dotted line, when no change of the rate of the counting pulses is provided on the gate 18. Actually, in the first part of the above process, the "clock" pulses applied to the gate 18 will come from a circuit 16 and pass through a gate 20; in the second part of this process, the clock pulses applied to the gate 18 will come from a circuit 17 and pass through a gate 21. The output of the shaping circuit 10 passes through a gate 22 to open the gate 18 which receives the clock pulses through gate 20 as long as the transducer 4 is active for the measuring process. Said gate 22 is inhibited as soon as the shaping circuit 11 is active, transducer 5 becoming active in the second part of the filling operation, and gate 20 is also inhibited. Simultaneously, since the output of 10 is no longer applied as an inhibiting signal on gate 21, the second clock pulse series is applied to gate 18 which is opened by the output of 11. Such a positive switching control arrangement operates, when the tank is emptied.

When the liquid medium is such as to preserve a substantially constant value of the velocity of the acoustic waves, the two series of clock counting pulses may be of fixed frequencies, and for instance, such series can be derived from the output of the master clock 1 through appropriate pulse multiplier frequency circuits. On the other hand, the value of the velocity of the acoustic waves will vary with local conditions of the liquid medium. More particularly the velocity of the acoustic waves within very low temperature liquid media, such as liquefied nitrogen or methane will vary substantially, when the temperature of the liquid varies by a few degrees. Furthermore, and particularly during filling operation, layers of varied compositions and/or temperature gradients may temporarily appear within the medium: the velocity may then have different values from the level of the transducer 4 to the level of the transducer 5, and conversely. It is therefore desirable to provide means for calibrating the frequencies of the two series of clock counting pulses in accordance to the variations of values of the velocity of the acoustic waves in the liquid medium.

The first counting pulse frequency calibrating system comprises a self-relaxation oscillator which, in turn, comprises a transmitter circuit 12, a receiver circuit 14, a transducer 6 arranged substantially at the same level in the tank as the transducer 4 and a wave reflector 49 associated to said transducer 6 for defining a constant length path which is substantially horizontal within the liquid medium. The relaxation frequency of such an oscillator depends on the velocity of the acoustic waves in the medium according to the relation:

ii. $f = c / (2L)$ $L$ being the value of the length separating the speaking face of 6 from the reflector 49. Assuming a base frequency of the relaxation oscillator of approximately 2,000 Hz, and a distance $L$ equal to 25 mm, the echo pulses, which maintain the relaxation oscillation and are further picked up at an input of the receiver circuit 14 are such that, after a frequency multiplication in the circuit 16, they apply to the pulse input of the gate 20 a series of recurrent pulses of an average frequency equal to about 500 K Hz, which is considered as an appropriate average value for the operation of the counter 19. The frequency multiplier 16 may consist of cascaded pulse frequency doubling or tripling circuits. The frequency of the pulses which are finally applied to the pulse input of the gate 20 is proportional to the actual value of the instantaneous velocity of the acoustic waves within the liquid medium and consequently responds to any variations in the value of the velocity with temperature changes as well as other local conditions acting thereon.

The other pulse frequency calibrating system similarly comprises a self-relaxation oscillator comprising a transmitter 13, a receiver 15, a further transducer 7 at substantially the same level as the transducer 5 and a reflector 50 horizontally located with respect to 7 at a predetermined distance therefrom. Said distance may also be provided substantially equal to 25 mm and the base frequency of the oscillator of the order of 2,000 Hz. The pulses issuing from the receiver 15 are applied to a pulse frequency multiplying circuit 17, similar to circuit 16, for applying counting pulse to the gate 21 with an actual frequency having a variation proportional to that of the velocity of the acoustic waves within the liquid medium at the level of the transducers 5 and 7.

With such a calibrating arrangement, the receiver 14 be inhibited when 11 is activated, concomitantly to the inhibition of the receiver 8.

As said, the equipment may be advantageously used for processing very low temperature liquid mediums. In such a case, it is desirable that the cables 24 to transducer 4, 27 to transducer 6, 31 to transducer 5 and 34 to transducer 7, all be in the form of a coaxial electrical conductor coated with fritted magnesia sheathed with stainless steel. Such cables are well-known and commercially available under the Trademark "Pyrotenax". Junction boxes 26, 28, 33 and 34 are provided for connecting the said cables with the external and normal coaxial cables 25, 29, 32 and 36 of the equipment.

Figure 2:
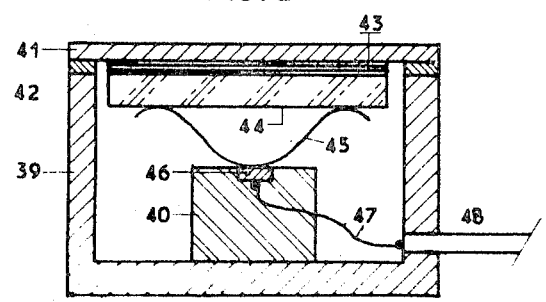
FIG.2 shows an illustrative embodiment of a transducer arran-gement for use in the equipment of FIG.1 when applied to the handling of very low temperature liquid medium.

Each transducer is made with a stainless steel casing 39–41, having a speaking face 41 FIG.2. The piezoelectric ceramic member 44 is applied to the speaking face 41 and pressed towards the inner face thereof by a spring blade 45 secured to a contact stud 46 inserted in a insulating block 40 fixed to 39. Between the piezoelectric member and the speaking face 41 is inserted an electric connection structure 43 made of a plurality of silver wires in a low temperature standing grease. The contact stud 46 is connected to the inner conductor of the "coaxial" Pyrotenax cable 48 the sheath of which is soldered or brazed to the stainless steel casing, in order to ensure watertightness to the inner volume of the transducer. Such an arrangement provides fair acoustical and electrical links between the ceramic member and the speaking face plate of the transducer and said links are maintained even under a condition of temperature shock when the transducteur contacts a liquid medium which has for instance a temperature of between 180° and 190° C.

What is claimed is:

1. An acoustic wave level measuring apparatus for use with large capacity liquid medium stocking tanks, comprising in combination:

a digital display metering indicator including a pulse counter;

first and second counting pulse generating means;

first electroacoustic wave transducer means activated by the presence of the liquid medium in the tank, to generate a first series of level measuring signals of medium accuracy of measurement during a complete operation of either filling, or emptying, the tank;

second electroacoustic wave transducer means activated by the presence of the liquid medium in an upper portion of the tank, generating a second series of level measuring signals of higher accuracy of measurement during that part of the filling, respectively emptying, operation concerning that upper portion of the tank, and, electrical signal gating means connected to said transducer and counter for controlling the selective application of the pulses from said first and second counting pulse generating means, to an activation input of said counter, said gating means including:

first means controlling the application of the pulses from said first counting pulse generating means to said activation input under the control of the signals of said first series, second means controlling the application of the pulses from said second counting pulse generating means to said activation input under the control of the signals of said second series, third means blocking the application of pulses from said second counting pulse generating means during the periods of inactivity of said second electroacoustic wave transducer means, and, fourth means blocking the application of pulses from said first counting pulses generating means during the periods of activity of said second electroacoustic wave transducer means.

2. Apparatus according to claim 1, wherein:

said first electroacoustic wave transducer means comprises a transducer located near the bottom of the tank and actuated from a source of medium frequency pulse electrical waves and a receiver of the said actuation wave and the echo pulses from said transducer, said receiver including means deriving therefrom a series of rectangular waveform signals the width of each of which is proportional to the time interval between a pulse from the actuation wave and the echo pulse from the transducer responsive to the said actuation pulse, said second electroacoustic wave transducer means comprises a transducer located in the upper part of the tank actuated from a high frequency pulse electrical wave and a receiver of the said actuation wave and the echo pulses from said transducer, said receiver including means deriving therefrom a series of rectangular waveform signals the width of each of which is proportional to the time interval between a pulse from the actuation wave and the echo pulse, said first counting pulse generating means comprises a transducer located at substantially the same level as the transducer of the said first electroacoustic wave transducer means, a wave reflector facing said transducer at a fixed horizontal distance therefrom, a self-relaxation oscillator arrangement of which said transducer and reflector are parts, and frequency multiplying circuits of the pulses from said oscillator arrangement, said second counting pulse generating means comprises a transducer located at substantially the same level as the transducer of the said second electroacoustic wave transducer means, a wave reflector facing said transducer at a fixed horizontal distance thereof, a self-relaxation oscillator arrangement of which said transducer and reflector are parts, and frequency multiplying circuits of the pulses from said oscillator arrangement, said first and second electrical signal gating means comprise an AND-gate receiving the counting pulses on one input thereof and the rectangular waveform pulses on another input thereof, said third electrical signal gating means comprises a gate receiving the pulses from the output of said frequency multiplying circuits of the second counting pulse generating means, having its output connected to the pulse input of the rectangular waveform signals from the said first electroacoustic wave transducer means through a gate having an inhibiting input fed with the rectangular waveform signals from the said second electroacoustic wave transducer means, the output of the last mentioned gate being further connected to the rectangular waveform input of said AND-gate, and, said fourth electrical signal gating means comprises a gate receiving the output pulses from the frequency multiplying circuits of the first counting pulse generating means, having its output connected to the pulse input of said AND-gate and having an inhibiting input connected to the output of the rectangular waveform signals from the said second electroacoustic wave transducer means, said last mentioned output being further connected to the rectangular wave-form input of said AND-gate.

3. Apparatus according to claim 2, wherein an open ended acoustic wave guide is inserted between each one of the transducers of the said first and second electroacoustic wave transducer means and the top of the tank.

4. Apparatus according to claim 2, wherein cables connecting said transducers to said receiver circuits consist of a cable having a central conductor coated with fritted magnesia and sheathed with stainless steel.

5. Apparatus according to claim 4, wherein each transducer comprises a stainless steel casing, and a piezoelectric ceramic plate which is spring pressed against the speaking face of the casing with interposition of silver wires within a low temperature grease, said casing being watertightly soldered to the stainless steel sheath of the corresponding cable.

6. Apparatus for measuring the level of liquid in a tank comprising in combination:

a first acoustic transducer located adjacent the bottom of the tank;

a second acoustic transducer spaced vertically upwardly from said transducer and located near the top of the tank but below the intended upper level of liquid in the tank, both transducers arranged to propagate acoustic energy upwardly through liquid in the tank and to produce an output signal whenever an acoustic echo is returned to a transducer from the surface of liquid in the tank;

means for synchronously energizing said transducer at substantially different frequencies, said second transducer being the higher frequency of the two;

indicator means providing a readout of liquid level in the tank; and means including a gate for energizing said indicator means from the output of said first transducer whenever the liquid level in the tank is below the level of said second transducer and for inhibiting the input of said first transducer to said indicator and for energizing said indicator from said second transducer whenever the level of liquid is above said second transducer.

7. Apparatus as defined by claim 6 including means for varying the frequency of operation of said gate in accordance with the velocity of propagation of sound in the fluid in the tank.

* * * * *